United States Patent
Raisch et al.

(10) Patent No.: US 7,533,287 B2
(45) Date of Patent: May 12, 2009

(54) METHOD FOR PROCESSING A CONNECTION-MODE IP CONNECTION ACCORDING TO NON-AVAILABILITY SITUATIONS

(75) Inventors: Jürgen Raisch, München (DE); Wolfgang Schrüfer, Karlsfeld (DE)

(73) Assignee: Siemens Aktiengesellschaft, Munich (DE)

( * ) Notice: Subject to any disclaimer, the term of this patent is extended or adjusted under 35 U.S.C. 154(b) by 453 days.

(21) Appl. No.: 10/572,213

(22) PCT Filed: Aug. 26, 2004

(86) PCT No.: PCT/EP2004/051921

§ 371 (c)(1),
(2), (4) Date: Mar. 17, 2006

(87) PCT Pub. No.: WO2005/032103

PCT Pub. Date: Apr. 7, 2005

(65) Prior Publication Data

US 2006/0271808 A1 Nov. 30, 2006

(30) Foreign Application Priority Data

Sep. 24, 2003 (DE) ................................ 103 44 344

(51) Int. Cl.
*G06F 11/00* (2006.01)
(52) U.S. Cl. ............................................. 714/4
(58) Field of Classification Search ........................ None
See application file for complete search history.

(56) References Cited

U.S. PATENT DOCUMENTS

| 5,751,719 | A | 5/1998 | Chen et al. | |
| 6,018,805 | A * | 1/2000 | Ma et al. | 714/4 |
| 6,212,175 | B1 * | 4/2001 | Harsch | 370/338 |
| 7,213,063 | B2 * | 5/2007 | Bressoud et al. | 709/223 |
| 7,406,035 | B2 * | 7/2008 | Harvey et al. | 370/218 |
| 2001/0056492 | A1 | 12/2001 | Bressoud et al. | |
| 2002/0111949 | A1 | 8/2002 | Barga et al. | |
| 2003/0014684 | A1 | 1/2003 | Kashyap | |
| 2006/0143494 | A1 * | 6/2006 | Bouat | 714/4 |

OTHER PUBLICATIONS

Lucent Technologies ; "White paper—Transforming Copper to Gold -High-revenue Voice-over-DSL Services"; 2000 ; Pages: Cover sheet and Table of Contents—3 pgs and pp. 1-28; XP002309422.
Andrew S. Tanenbaum; "Computer Networks, Third Edition, 6.2.6. Crash Recovery"; The Transport Layer, Elements of Transport Protocols; 1996; p. 508—p. 510; XP002309421; Prentice-Hall.

* cited by examiner

*Primary Examiner*—Michael C Maskulinski

(57) ABSTRACT

A method for processing a connection-mode IP connection is provided. Generic methods known from the prior are problematic in that in the case of connection-mode IP communication connections between two control devices the connection-mode data are lost in one of the control devices after a non-availability situation and thus the messages received cannot be associated with a connection. The method provides that the messages emitted by the sending control device are made available to the upper layer of the connection-mode communication connection, which uses the same as a criterion for the preferential recovery of intact connections.

10 Claims, 1 Drawing Sheet

METHOD FOR PROCESSING A CONNECTION-MODE IP CONNECTION ACCORDING TO NON-AVAILABILITY SITUATIONS

CROSS REFERENCE TO RELATED APPLICATIONS

This application is the U.S. National Stage of International Application No. PCT/EP2004/0051921, filed Aug. 26, 2004 and claims the benefit thereof. The International Application claims the benefits of German application No. 10344344.4 DE filed Sep. 24, 2003, both of the applications are incorporated by reference herein in their entirety.

FIELD OF INVENTION

The invention relates to a method in accordance with the claims.

BACKGROUND OF INVENTION

The communication between subscribers, such as ISDN/PSTN subscribers for example, conducted hitherto by way of conventional circuit-switched telecommunication networks is conducted by way of IP networks in the case of later communication architectures. Conventional ISDN/PSTN terminal devices connected to terminating devices (Integrated Access Devices, IAD) for xDSL paths or else also IP based terminal devices employing corresponding IP based signaling (H.323/SIP), for example, can be used as terminal devices.

The aforementioned terminating devices are controlled by control devices or control units, which can be part of a packet-oriented switching system. A large number of connection-mode IP communication connections (TCP, SCTP for example) are routed between control unit and terminating device (25,000 for example). In order to control the connections, connection-related data (such as Transmission Control Block, source addresses, destination addresses, the status of the connection or statistical data etc., for example) must be stored in the terminating device and the control unit. Non-availability situations affecting the control unit (resulting from a failure (fault), Reset command or manual reconfiguration, for example) are detected in the terminating device. In the case of connection-mode IP connections this now presents the problem whereby these connections can only then continue to be used when the control unit becomes available again if all the connection-related data for the connections is still present in the control unit as previously. However, this is not generally the case when a control unit becomes available again.

When the control unit fails, the connection-related data is also lost. This means that a control unit which becomes available again that is receiving messages by way of the still active—from the viewpoint of the terminating device—connections is unable to assign these to any IP connection. As a result of the non-availability of the control unit, from the latter's viewpoint the communication connection with the terminating device becomes inactive. The messages received by the latter become out-of-the-blue messages.

With regard to the prior art, the IP connection must then be reestablished or recovered (Restart). However, this also means that all incoming messages from the time of the failure up to the recovery of the IP connection will be lost because they are discarded by the transport layer. The establishment or recovery of an individual IP connection takes place very quickly; the establishment of a plurality of IP connections takes place sequentially. Since the communication by way of the control device takes place over a large number of IP connections, a significant period of time is therefore required overall depending on their number in order to establish all the IP connections. At least the last terminating device thus remains faulty until such time as all IP connections have been reestablished.

SUMMARY OF INVENTION

The method known from the prior art is problematic in that the subscribers are out of order and also signaling messages may be lost for the period of time that is required in order to reestablish all the connections. Incorrect billing resulting from excessive re-availability times is likewise possible, as also is the failure of stable connections. For long data transmissions such extended re-availability times can definitely still be tolerated whereas they are totally unacceptable for video or even voice communication.

An object of the invention is therefore to demonstrate a method for how to handle connection-mode IP connections after non-availability situations in order to improve the quality of the communication (QoS).

This object is achieved based on the features specified in the independent claim.

An important advantage of the invention is to be found in its minimization of the duration of the problem for active communication partners, whereby the restoration of all connections with passive communication partners may continue for longer. This is achieved by forwarding the messages in the case of the connections which have not yet been established/recovered, whereby message loss is minimized. Fundamentally, the invention provides a simple, robust solution with high subscriber availability.

A further advantage of the invention consists in the fact that the available processor time is used only for the connections which are actually required at the present time. As a rule these are the connections whose messages arrive within a certain period of time after re-availability. General establishment of all connections is only performed subsequently in a later phase. This enhances the quality of the transmission system.

Advantageous developments of the invention are set down in the dependent claims.

BRIEF DESCRIPTION OF THE DRAWINGS

The invention is described in more detail in the following with reference to two embodiments represented in the figures, in which.

DETAILED DESCRIPTION OF INVENTION

Within the scope of Voice over DSL (VoDSL), terminating devices IAD are used for the connection of analog and ISDN telephones as Remote Gateways. MGCP (Media Gateway Control Protocol RFC 2705) is used for switching the voice, the IUA protocol (ISDN Q.921—User Adaptation RFC 3057) is used for tunneling the ISDN messages and the SCTP protocol (Stream Control Transport Protocol RFC 2960) is used as the transport protocol. The terminating device IAD physically terminates the ISDN protocol but is controlled by the switch (peripheral control unit PCU).

Figure 1:
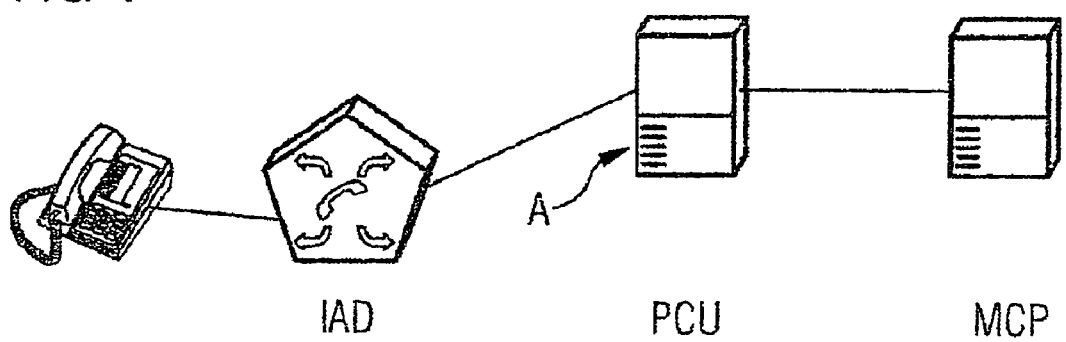
FIG. 1 shows the configuration between a terminating device and a control unit arranged in non-redundant fashion.

FIG. 1 shows a configuration between a first and a second control device. In this situation, the first control device is implemented as a terminating device IAD and is controlled by the second control device. The latter is implemented as a non-redundant control unit PCU (Peripheral Control Unit, PCU) in accordance with the present first exemplary embodiment. A Media Control Platform MCP can also be discerned from FIG. 1, which operatively interacts with the control unit PCU.

Connection-mode IP communication connections or IP connections are routed between the terminating device IAD and the control unit PCU (25,000 for example). While all these IP connections are active in the sense that status requests are exchanged over them cyclically, only one part of them—in other words about a maximum of 1,000 for example—should be considered as used IP connections.

In accordance with the present first exemplary embodiment, it is now assumed that the control unit PCU fails as a result of a fault. As a result, even when it becomes available again the connection-mode data maintained therein will have been lost but this data is however still available in the terminating device IAD and from the latter's viewpoint the IP connections routed by way of the failed control unit PCU are still active. If the data sent to the (failed) control unit PCU of the terminating device IAD is not acknowledged, the latter attempts to specifically address the control unit PCU. If the terminating device IAD receives no information only after repeated unsuccessful addressing attempts, the IP connection is switched to "inactive", which state may persist for an extended time.

According to the invention, an algorithm A for handling connection-mode IP connections following non-availability situations is implemented in the in the control unit PCU. This ensures that the recovery of an IP connection is started depending on the actual communication requirement. In this way, all the messages for which the IP connections no longer exist as a result of the failure of the control unit PCU, are not generally discarded by the transport layer as per the prior art by the connection protocol (TCP, SCTP etc.), but are forwarded for further processing to the user layer, in other words the upper layer.

In the user layer a decision is then taken as to how the received message should be further processed. This is done by carrying out plausibility checks. If the message in question is valid, then a renewed connection setup can be initiated by the user layer and in parallel with this the message can be passed on by the transport layer to the Media Control Platform MCP for further processing. Conversely, a connection setup can likewise first be initiated by the user layer and the message processed further after the connection has been established. This means that messages are not lost. In the ideal situation no failure of any of the communication partners will be noticed.

Fundamentally, all the IP connections (25,000 for example) to the terminating device IAD are to be reestablished/recovered by the control unit PCU following re-availability. If a connection is established by the control unit PCU to the terminating device IAD, the latter recognizes that similar active IP connections still exist from its viewpoint, copies over the relevant connection-related data and thereby recovers the IP connection with the control unit PCU.

The connection setup for all the IP connections is not performed individually but in blocks (for example 1,000 connections per step). If messages from used but not yet recovered IP connections arrive during this connection setup process, these are regarded as having priority. The IP connections associated with these messages are then reestablished as a matter of priority by interrupting the general connection setup process at this point, establishing the IP connection in question and resuming the general connection setup process. Similarly, IP connections will then be dealt with as a matter of priority when a message is to be sent by the control unit PCU to the corresponding IAD.

For precautional reasons it can be appropriate to not allow the algorithm A to run permanently but only for a defined period of time. This period of time is known to the user layer and can be notified to the connection protocol. For example, the algorithm A can be started when the control unit PCU restarts and shut down again once all the IP connections (25,000 for example) have been recovered.

Figure 2:
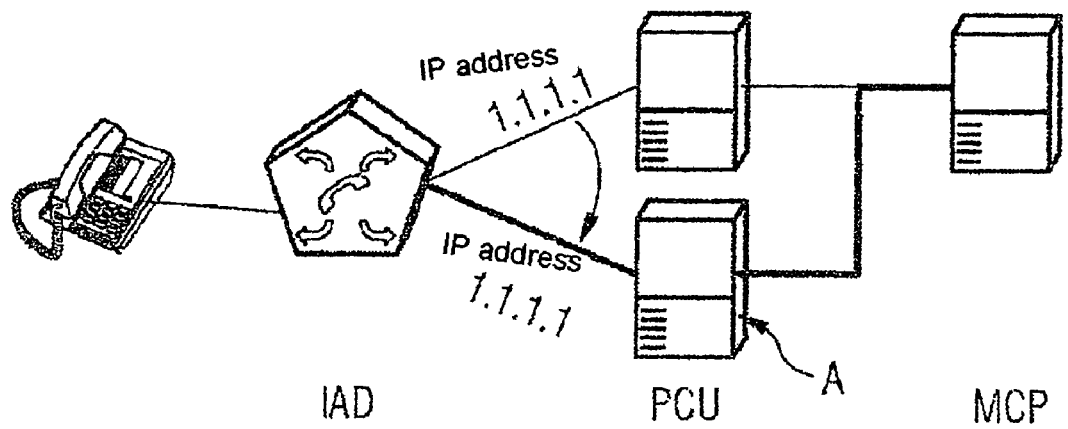
FIG. 2 shows the configuration between a terminating device and a control unit arranged in redundant fashion.

FIG. 2 illustrates a second embodiment. According to this, a configuration between a first and a second control device is similarly illustrated here. The first control device is implemented as a terminating device IAD and is controlled by the second control device. The latter is implemented according to the present second embodiment as a redundant control unit PCU (Peripheral Control Unit, PCU). In this situation, one half of the control unit PCU exhibits an active operating state while the other half of the control unit PCU exhibits a standby operating state. In addition, a Media Control Platform MCP can be discerned from FIG. 2, which operatively interacts with the control unit PCU.

In the normal state (availability situation) the connection-mode IP connections (TCP, SCTP for example) are routed between the terminating device IAD and the active half of the control unit PCU.

In accordance with the present second exemplary embodiment, it is now assumed that the active half of the control unit PCU fails as a result of faulty behavior. From the viewpoint of the terminating device IAD the IP connections routed by way of the failed control unit PCU are still active. The failure is very quickly recognized by the redundantly arranged half of the control unit PCU and the IP address of the formerly active half is transferred to the standby half. This has the advantage that no re-addressing needs to be undertaken in the still active IP connection. As a result of the failure of the active half of the control unit PCU the connection-mode data will now also have been lost here but the data is still available in the terminating device IAD.

According to the invention, provision is now also made here to start the reestablishment of the IP connections according to the same algorithm A as described in the first embodiment. In this situation, all the messages for which a connection no longer exists are not generally discarded by the transport layer as per the prior art by the connection protocol (TCP, SCTP etc.), but are forwarded for further processing to the user layer, in other words the upper layer. In this case it can also be appropriate not to allow the algorithm A to run permanently but only for a defined period of time. This period of time is known to the user layer and can be notified to the connection protocol. For example, the algorithm A can be started when the control unit PCU restarts and shut down again once all the IP connections (25,000 for example) have been recovered.

As a general principle it should be stressed that although connection-mode IP connections are referred to in both embodiments the invention is not however restricted to IP connections. Connection-mode connections of any type (such as ATM, MPLS, Frame Relay etc. for example) can be handled using the method according to the invention. In addition, reference was made in both embodiments to IP connections which are implemented functionally as signaling connections. However, this is not intended to constitute any limitation; bearer connections can be handled in the same way. Finally, the failure of the control unit PCU was referred to as the non-availability situation. However, a Reset command or a manual reconfiguration can likewise be considered as non-availability situations.

The invention claimed is:

1. A method for processing a connection-mode communication connection via a first network communication device, comprising:
    receiving a message from a second network communication device after a non-availability of the first device and during a recovery of the first device;
    providing the message to an upper layer of a protocol for the connection; and
    using the message via the upper layer for the recovery of the connection,
    whereby the message is not lost during the recovery of the connection,
    wherein the communication with the second network communication device becomes inactive after the non-availability of the first device,
    wherein the message is routed via the connection that was established prior to the non-availability, and
    wherein after receiving the message a general recover process for the connection is interrupted for the duration of the recovery of the connection.

2. The method according to claim 1, wherein the connection-mode communication connection is an IP connection.

3. The method according to claim 1, wherein an algorithm is started after restarting the first network communication device.

4. The method according to claim 3, wherein the algorithm is stopped after all the connections have been recovered.

5. The method according to claim 1, wherein the connection-mode communication connection is an IP connection.

6. The method according to claim 5, wherein the algorithm is stopped after all the connections have been recovered.

7. The method according to claim 1, wherein an algorithm is started after restarting the first network communication device.

8. A method for processing a connection-mode communication connection via a first network communication device, comprising:
    receiving a message from a second network communication device after a non-availability of the first device and during a recovery of the first device;
    providing the message to an upper layer of a protocol for the connection; and
    using the message via the upper layer for the recovery of the connection,
    whereby the message is not lost during the recovery of the connection;
    wherein the message is routed via the connection that was established prior to the non-availability, and
    wherein after receiving the message a general recover process for the connection is interrupted for the duration of the recovery of the connection.

9. A method for processing a connection-mode communication connection via a first network communication device, comprising:
    receiving a message from a second network communication device after a non-availability of the first device and during a recovery of the first device;
    providing the message to an upper layer of a protocol for the connection; and using the message via the upper layer for the recovery of the connection,
    whereby the message is not lost during the recovery of the connection, wherein the first network communication device is a Peripheral Control Unit (PCU).

10. A method for processing a connection-mode communication connection via a first network communication device, comprising:
    receiving a message from a second network communication device after a non-availability of the first device and during a recovery of the first device;
    providing the message to an upper layer of a protocol for the connection; and using the message via the upper layer for the recovery of the connection,
    whereby the message is not lost during the recovery of the connection, wherein the second network communication device is an Integrated Access Device (IAD).

* * * * *